Nov. 8, 1955 H. ANTRANIKIAN 2,723,304

COLOR TELEVISION SYSTEMS

Filed Oct. 18, 1951 3 Sheets-Sheet 1

INVENTOR.
HAIG ANTRANIKIAN
BY
Sanger & Kennedy
ATTORNEYS.

Nov. 8, 1955 H. ANTRANIKIAN 2,723,304

COLOR TELEVISION SYSTEMS

Filed Oct. 18, 1951 3 Sheets-Sheet 2

INVENTOR.
HAIG ANTRANIKIAN
B
Sawyer & Kennedy
ATTORNEYS.

Nov. 8, 1955 H. ANTRANIKIAN 2,723,304

COLOR TELEVISION SYSTEMS

Filed Oct. 18, 1951 3 Sheets-Sheet 3

INVENTOR.
HAIG ANTRANIKIAN
BY
Sawyer & Kennedy.
ATTORNEYS.

2,723,304

COLOR TELEVISION SYSTEMS

Haig Antranikian, Lakewood, N. J.

Application October 18, 1951, Serial No. 251,933

3 Claims. (Cl. 178—5.4)

This invention relates to improvements in color television systems.

More particularly, the invention is concerned with a television system of the type in which the camera tube is provided with a screen having a cyclic repetition of strips for responding to desired component colors and the kinescope or reproducing tube is provided with a screen having a similar cyclic repetition of strips reproducing the respective component colors. Such systems have marked advantages over mechanical systems and also over electronic systems which require, in effect, camera and reproducing screens each of which requires a complete point screen pattern corresponding to each of the component colors.

In prior systems of the type contemplated, it has been proposed to control scanning and synchronization by utilizing conductive strips, the strips corresponding to any given component color being connected together to form a single set and the sets for the various component colors being insulated from each other. Apart from the necessary complication and expense in the tube structure, the difficulty in sorting and transmitting the pulses corresponding to the various colors and synchronizing the response of the receiver has been very considerable. Generally speaking, the electron beam has been controlled in one way or another by means of the electric charge of the sets of strips.

The present invention provides a system in which the successive picture elements or dots may, in effect, be produced and reproduced and the reproduction synchronized to the transmission in any manner adequate for monotone television. A single electron beam may be used in both camera tube and picture tube. In addition, the color of the picture element produced is controlled electronically as desired in a manner not requiring the matching of the transmitting and receiving screen constructions, but which provides accurate color tracking and eliminates cumulative or persistent errors. The system may readily be made compatible with existing television receivers so as to permit reception of the color broadcast in black and white on existing receivers with little or no adaptation.

A system embodying the invention in a preferred form will now first be described with reference to the accompanying drawing, and the features forming the invention will then be pointed out in the appended claims.

Figure 1:
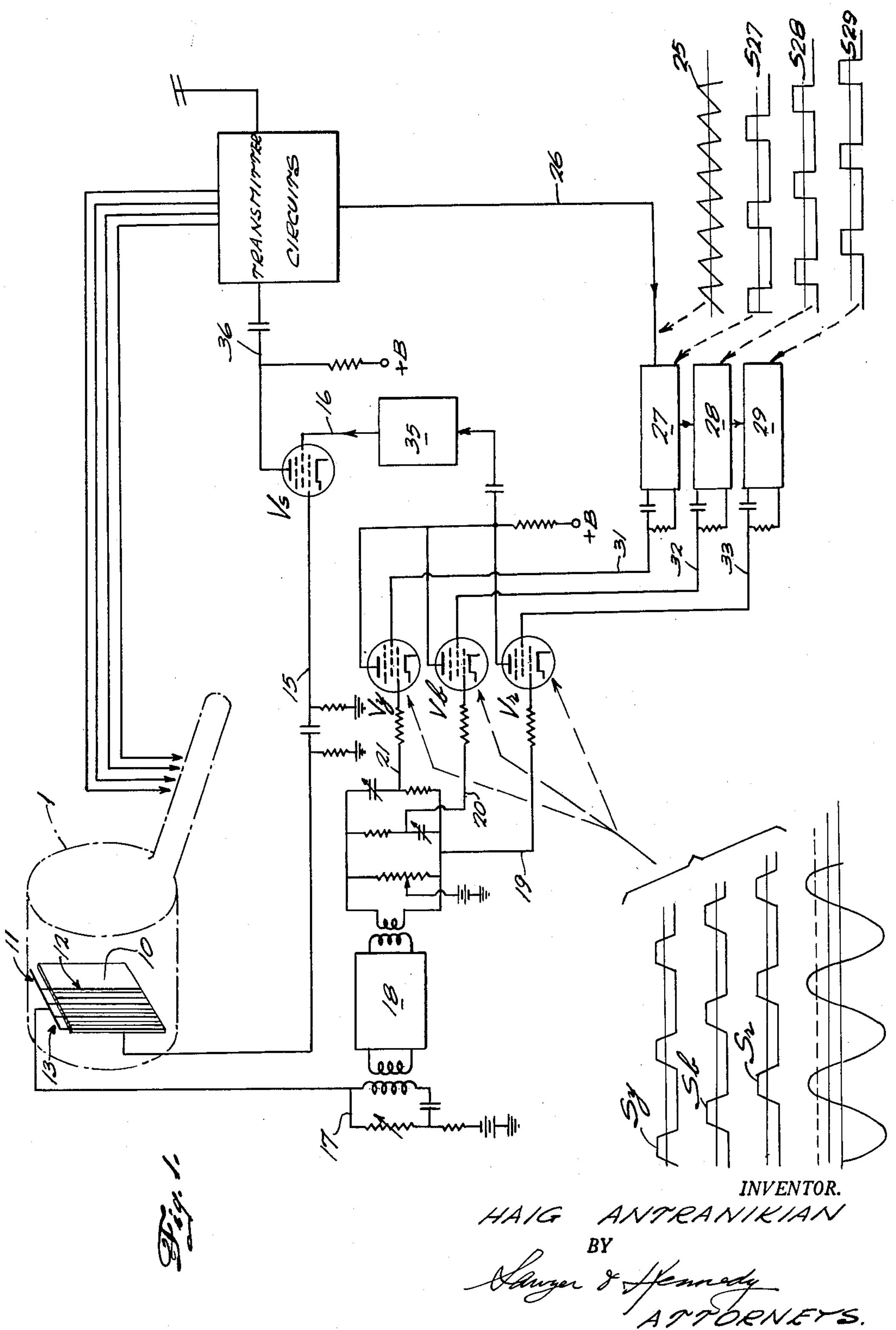
Figure 1 is a schematic of a transmitter embodying the invention in a preferred form of embodiment.

Figure 1 represents schematically a transmission system embodying the invention in a preferred form. A camera tube or iconoscope 1, of generally known form, is utilized. Lines 2, 3, 4, 5 and 6 indicate suitable connections to the transmitter circuits, indicated in block form, for supplying the usual voltages for forming the electron beam and moving the same horizontally and vertically.

The photosensitive screen 10 is of special form and a special color grid 11 is associated with it. Otherwise, the structure and operation of the camera tube may be conventional.

Figures 2, 3:
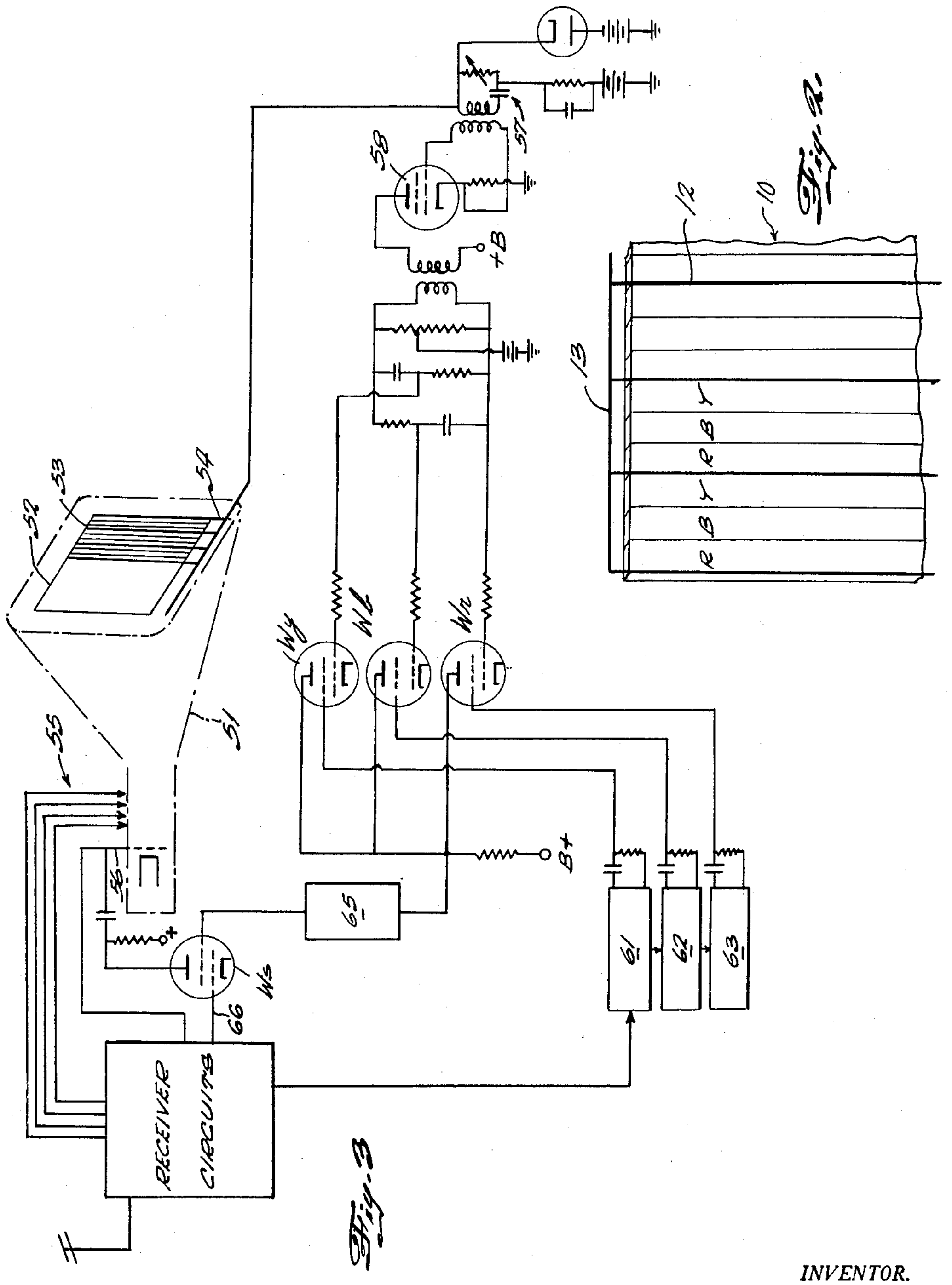
Figure 2 is an enlarged detail of the photosensitive screen used in the camera tube of Figure 1.
Figure 3 is a schematic of a receiver embodying the invention in a preferred form.

The screen 10, as shown on an enlarged scale in Figure 2, comprises a number of parallel strips R, B, Y for the red, blue and yellow light components of the image. These strips are rendered sensitive to the desired colors in any convenient way. Thus, the photosensitive screen may consist of strips having the desired color sensitivities, or a monotone screen may be used in conjunction with color filter strips. Construction of a screen of this type is well known in itself, being disclosed, for example, in a variety of forms in prior United States Patents Bedford 2,307,188; Leverenz 2,310,863; Schroeder 2,446,249; Swedlund 2,446,440 and Brownell 2,461,515. The present invention is not concerned with the particular manner in which the individual strips are rendered sensitive to desired color components. It will be noted, however, that the present invention permits great simplification in the screen structure due to elimination of need for special attention to conductivity and insulation of the strips.

The grid 11 comprises a number of parallel wires or conducting elements 12 running parallel to the R, B, Y strips, one wire being provided for each set of three strips, and the wires being connected to a common terminal conductor 13. As shown, the wires are placed between the R and Y strips, but they may be located otherwise so long as a definite relation to the cyclically repeated color strip pattern is maintained. It is preferred that the grid wires 12 be actually on or in the screen so as to eliminate danger of faulty registration.

The invention is not limited to any particular number of lines or to any single scanning method. For definiteness, however, and to indicate typical mechanical and electrical dimensions, reference will be made by way of illustration to a 500 line screen with 3 x 4 aspect and to a standard FCC interlacing signal, with 60 cycle vertical sweep frequency and 15,750 cycle horizontal sweep frequency. On these assumptions, there may be about 460 or more sets of color strips (each set including an R, B and Y strip). The width of each strip may be about one-third the width of each set and the electron beam is correspondingly narrowed so as to be able to read predominantly a single strip. As will be apparent in the later description, the width of a set of strips may bear any desired ratio to the width (or height) of a line so as to correspond to other receiving systems.

The system illustrated may be employed for field sequential or line sequential operation, and in the latter case may be made compatible with present monotone transmission so as to be received in black and white on existing black and white television receivers.

The voltage produced in the wires 12 and grid 11 is utilized to produce a sequence of three timed pulses synchronized with the passage of the electron beam in the camera tube across the R, B and Y strips, and these pulses are suitably combined with pulses produced in synchronism with the horizontal or vertical sync signal so as to transmit according to a line or field sequential system as the case may be. The system will be described first as adapted to field sequential transmission and thereafter as adapted to line sequential transmission of various types, or to point sequential transmission.

*Field sequential transmission*

The video signal from the camera tube 1 is applied through a condenser 15 to a control grid of pentode Vs, a color synchronizing or switching signal being applied to another control grid of tube Vs through line 16. This latter signal is produced by suitable combination of a signal from the grid 11 and synchronizing or switching pulses derived in a manner now to be explained.

The current pulses from grid 11 are conducted through a variable phase impedance network 17 coupled to an amplifier 18, the output of which supplies the three pentodes Vr, Vb and Vy through a phase shifting network, so as to produce pulses Sy, Sb and Sr, in three phases as indicated in the drawing, in the outputs of the pentodes. There may be substituted for amplifier 18 a suitably damped oscillator.

There is indicated in Figure 1 below the output signal Sr, the input signal to a control grid of the pentode Vr through line 19, the bias and operating conditions of this tube being adjusted so as to reproduce only the peaks in the sinusoidal input to the grid and clip these peaks in a desired manner so as to produce the output signal Sr from the pentode Vr. The sinusoidal inputs to the pentodes Vb and Vy will be similar but shifted in phase to correspond to the output signals Sb and Sy, as indicated. Where the screen strips for the various colors are of equal widths, the duration of the pulses and the lag of the pulses one after another will be equal. Where, for any reason, it is desired to make the strips for producing the different component colors of somewhat different widths, the pulse duration and phase relationship may easily be adjusted to suit.

The vertical sweep signal or sync signal 25 is transmitted through line 26 to keyed multivibrators 27, 28 and 29, which produce output signals S27, S28 and S29, these signals being fed through connections 31, 32 and 33 to control grids of the pentodes Vr, Vb and Vy. The output of these three pentodes is applied to a control grid of the pentode Vs through the line 16 from a suitable phasing and further wave shaping circuit indicated in block form at 35. The circuits are so arranged that when no signal is applied to pentode Vs through line 16, the video signal is blocked and no signal is transmitted from the output 36 of this pentode to the transmitter. If, however, a signal is developed in the output of any of the pentodes Vr, Vb or Vy, the video signal will be passed through the pentode Vs to the transmitter. Similarly, the pentodes Vr, etc., will develop output voltage only if the color pulses supplied to their grids and the pulses from the multivibrators coincide.

In field sequential operation, it will be understood that the color signal pulses Sr, etc. are represented on a scale very much larger than the pulses S27, etc., the latter corresponding to a complete field, while the former correspond substantially to one point of a field. Thus, if the frequency of the signal S27 is 60 cycles per second, the frequency of the signal Sr may be about 4 megacycles or more, the precise frequency depending upon the number of grid elements 12. As will now be apparent, during any scanning of the field one of the tubes Vr etc. will be activated by a pulse from the relative signal S27 etc., while the other two tubes will be inactivated. Accordingly, only one of the tubes Vr etc. will produce output during a given scanning of the field, and the tube Vs will, accordingly, pass the video signal only during the pulses of the relevant signal Sr etc. Since the pulses of the signals Sr are synchronized with the passage of the electron beam over strips corresponding to a single component color, video signals corresponding to a given color will be transmitted during each scanning of the field. During the next scanning of the field, the next tube Vr, etc. will be activated by its appropriate signal, the other two tubes will be inactive and a second color will be transmitted.

The field scanning frequency of 60 cycles per second mentioned above is purely by way of illustration, and for field sequential operation this frequency may be increased, with corresponding increase in the transmission band width required.

*Interlace in field sequential transmission*

The system just described may be utilized, by suitable selection of the multivibrator frequencies, to shift color on either each frame or each interlaced field.

The frequency of signal 25 or the color switching signals S27, etc. may be selected, if desired, to correspond to scanning of the field frame or part thereof and it will be apparent that almost any desired color interlacing may be obtained without difficulty.

*Field sequential reception*

Figure 3 shows schematically a suitable receiving system for use with the transmission system of Figure 1. The picture tube 51 is of usual type, except that the phosphorescent screen 52 is modified, and a grid structure 53 is provided.

Figure 2, which illustrates the camera tube screen and grid, may also serve to illustrate the picture tube screen and grid, the arrangement of the color strips R, B and Y and the parallel grid wires or conductors being the same in both cases. The picture tube screen itself may be a uniform phosphorescent screen of the monotone type having appropriate color filter strips R, B and Y associated with it, or it may be composed of phosphor strips R, B and Y producing red, blue and yellow light respectively.

The vertical and horizontal sweeps of the picture tube are controlled through appropriate connections 55 in the usual way, but the video signal applied to the control grid 56 is modified in the manner about to be described.

As the electron beam in the picture tube crosses any of the conductors 53 of the picture tube color grid, a voltage is developed which is applied to the variable phase impedance network 57 coupled to the input of tube 58, the output of which is applied through a phase shifting network to control grids of the tubes Wr, Wb and Wy. The vertical sync signal is applied through line 60 to keyed multivibrators 61, 62 and 63, the outputs of which are applied to respective grids of the tubes Wr, Wb and Wy. The output of tubes Wr, etc. is, in turn, applied through a suitable phasing and further wave shaping circuit indicated at 65 to a control grid of tube Ws.

The video signal is applied to a second control grid of tube Ws through connection 66. Signal voltage is developed in the output of Ws only when the video signal from line 66 and the color sync signal from tubes Wr etc. coincide. The signals applied to the grids of these tubes are similar to the signals Sr, etc. and S27 etc., and in consequence, only one tube will deliver output during each scanning of a field or half field, as the case may be. Accordingly, Ws will pass video signal only while the electron beam is scanning strips of a given color, during each field or half field, and the different colors will thus be reproduced in proper succession in the successive frames or half frames.

In the system as thus far discussed, it might seem that color inversion could occur, as for example, a steady reproduction of blue for red, yellow for blue and red for yellow. The colors may, however, be brought into, and locked in proper correspondence by adjusting impedance 57 to alter the phase of the color grid pulses with reference to the passage of the electron beam across the grid elements 53.

*Color grid and screen modifications*

While the color grids are shown as having an element 12 or 53 for each set of three color strips, this is by no means essential. The elements 12 may be spaced apart by six, nine or even more strips, so long as (*a*) the pulses occur with sufficient frequency to key or hold the frequency of damped oscillator 18, and (*b*) minor variations in the width of the color strips do not cumulate to a sufficient extent to affect color synchronization. Similarly, a reduced number of grid elements 53 may be used in the picture tube. In such case, it is merely necessary to choose the elements of the circuit associated with tube 58 so as to form a suitably less damped oscillating circuit, of the proper frequency held in synchronism by the pulses from grid elements 53. It will now be apparent that the number of grid elements in the picture tube and camera tube, and, therefore, the frequency of the keying pulses in the two tubes are substantially independent from each other and may be varied within wide limits.

While the screen has been shown as composed of a succession of sets of three strips, one for each of three component colors, it will be apparent that the system is applicable also to two, four or more color systems, the color strips being correspondingly changed and the necessary alterations in the circuits to produce appropriate signals S*r*, etc. and S27, etc. being obvious.

While the component colors have been indicated as red, blue and yellow, it will be understood they may be any preferred and convenient component colors found suitable.

The grids 11 and 54 have been described as being formed by conductors separate from or in addition to the color strips. It will be readily understood, however, that when three different photosenstive materials or three different phosphors are used in the device, one of those photosensitive materials or phosphors may be made more or less conductive than the others, either by selection of suitable materials or by incorporation of conductive substances. In this case, the photosensitive or phosphorescent screen itself without the addition of separate grid conductors may be used to generate the color synchronizing pulses. Similarly, where filter strips are used for differentiating the strips reproducing the desired component colors, differential conductivity in the filter strips may be employed for generating such pulses. While such an expedient is not ordinarily necessary, and ordinarily introduces needless complication in the construction, the grid elements or difference in conduction in a set of strips may also be employed for generating color synchronizing pulses.

*Line sequential operation*

For line sequential operation, the horizontal sync pulse is utilized as signal 25 instead of the vertical sync pulse, and the frequency of multivibrators 27, 28 and 29 is correspondingly modified. Thus, as each line is scanned, only one color is picked up, the other two being suppressed. In the next line, the next color is picked up, and so on. This system, in view of the physiology of human sight, possesses the very distinct advantage that much narrower transmission band widths may be used, a band of present monotone width being quite satisfactory.

For a non-compatible system or system not capable of reception in black and white on present receivers, the number of lines and the frequency and scanning of the lines may, of course, be selected without difficulty for a variety of different types of operation. Thus, where the entire field is scanned without interlace as between alternate lines, a triple interlace is nevertheless provided, three scans of the field being required to cover the strips of the three colors in each line. Thus, the red strips in the first line may be scanned, the first time the electron beam covers the field, the blue strips the second time and the yellow the third time, while in the second line, the order will be blue, yellow and red, etc.

It will be apparent that there is thus a triple interlace even where interlacing as between lines is not utilized.

Interlacing as between lines may also be employed, in which case a complete scanning cycle will include six scannings of the screen by the electron beam. It will be apparent that the scanning frequency required is by no means a multiple of a monotone scanning frequency, for comparable definition and lack of flicker.

Where a compatible system is desired, the necessary adaptations may readily be made, and in either of two ways, one utilizing the present FCC standard signal, and the other modifying that signal slightly and in a manner which will not interfere with reception in monotone on present monotone receivers.

The horizontal sync frequency is, of course, a multiple of 60 cycles per second, and it is desirable not to disturb this relationship as it provides a very convenient synchronization between transmitter and receiver in a majority of areas. The horizontal sync frequency is, therefore, conveniently 15,750 cycles per second, corresponding to 525 lines for a complete field, or some other convenient multiple of 60 cycles per second. It will be apparent that with this scanning frequency the line and color interlace will be automatic where the number of colors utilized is two or four, but that some special provision in color interlace requires to be made where a three color system is used, by reason of the fact that the number 525 is divisible by three, so that if the color sync pulses are triggered by each pulse of a horizontal sync frequency as mentioned, the scanning will return to the same color in each line of a complete field. With 525 line interlace scanning, the first scanning of the second half field must commence after 262½ horizontal sync pulses, so that the scanning of the second half field will commence with the second color. This condition may readily be corrected by incorporating in the signal during the vertical blanking intervals, a suitable color sync pulse for advancing the output of the multivibrators by one horizontal sync pulse interval, so as to shift the first color scanned on each scanning of the field. As will be apparent to those skilled in the art, such a pulse may be inserted in the signal during a vertical blanking interval in a variety of ways so as not to interfere with reception of the signal for monotone reproduction on existing receivers. Alternatively, the standard FCC sync signal during a vertical blanking interval may be used to generate a suitable signal for so advancing the multivibrators' output, without incorporating in the signal any special pulse for this purpose. In either event, nothing more than obvious adaptation of variable reactance AFC or fly wheel sync circuits will be required.

The line sequential receiver operation will be obvious in view of the foregoing disclosure, being related to the horizontal sync pulses instead of the vertical sync pulses as in the case of the line sequential transmission.

*Modification*

Figure 4:
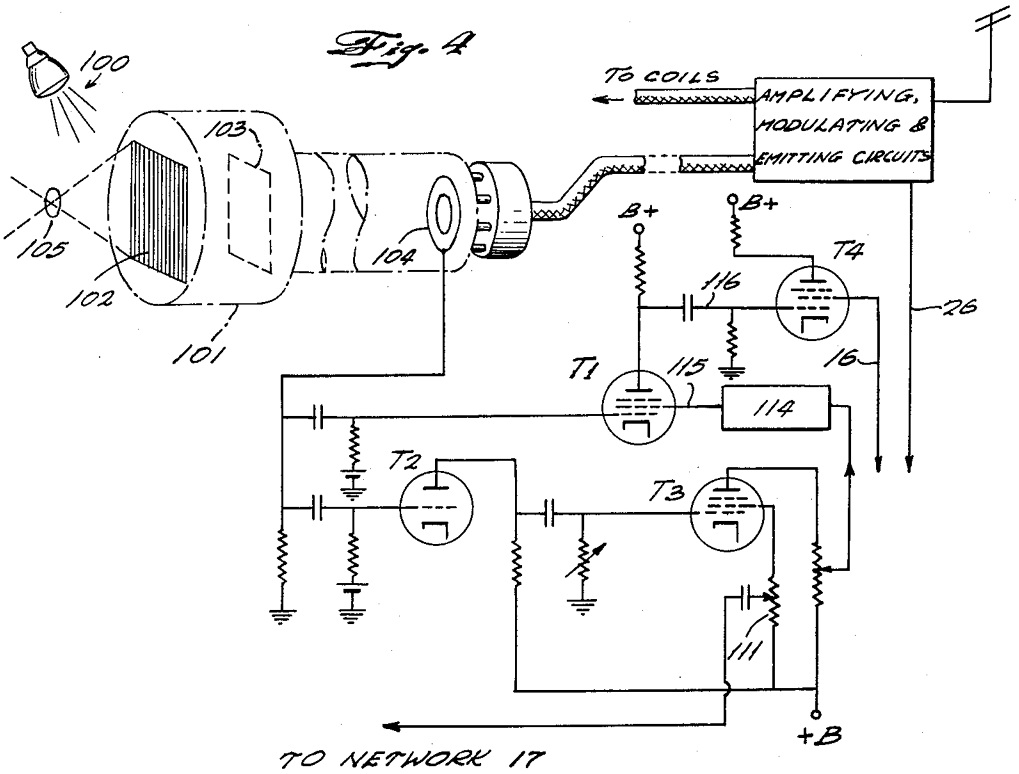
Figure 4 is a schematic showing a modification of the transmitting system of Figure 1.

The modification shown in Figure 4 permits the elimination of the grid 11 utilized in the circuit of Figure 1, the signal corresponding to one of the color strips being substituted for the signal produced by this grid. This modified form is especially useful when the camera tube is an image orthicon or other tube of the type in which the photosensitive or other surface is not directly scanned. There is illustrated schematically in Figure 4 a camera tube 101 of the image orthicon type containing a photosensitive screen 102, which is associated with a target 103, the output being developed in a signal plate 104. The photosensitive screen 102 may be identical to the screen 10 previously described, the grid 11, however, being omitted. In addition to the image focused on the screen 102 by the focus system indicated schematically at 105, a monotone light 100 of desired color corresponding to one of the R, B, Y strips is also cast on the screen, this light being of uniform intensity over the entire screen. While other colors may be utilized, it will be assumed for definiteness that the light 100 is suitable for activating the Y strips of the screen which transmit the yellow component color. The intensity of light 100 is adjusted so as to produce a signal at a level ( Figure 5) above level M of the maximum response to the picture image projected on the screen. The yellow video signal is thus elevated entirely above the level A and below the lower level M, while the blue and red signals are also below the level M. In the circuit now to be described, the yellow signal is dissected to provide the color sync pulse and also to eliminate the signal at level A, corresponding to the illumination from source 100, so as to restore the proper relative values of the color video signals before transmission.

Figure 5:
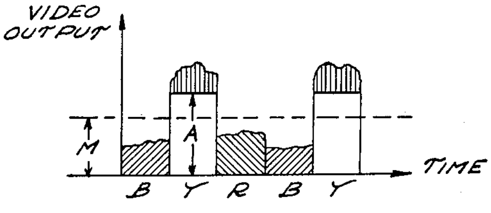
Figure 5 is a diagram showing the color signal as developed in the circuit of Figure 4.

A signal from signal plate 104 is applied to the control grid 110 of pentode T1 and to the control grid of triode T2. The tube T2 is biased to produce a signal only for video outputs exceeding the signal level M, while grid 110 of the pentode T1 is biased for producing output corresponding to the entire video signal as shown in Figure 5. The output of tube T2 is fed to a control grid of tube T3, which is biased to cut off when the input to tube T2 reaches the level A. The corresponding output voltage developed in the screen grid of this tube (operating as a second anode) is taken off potentiometer 111 and fed through a line 112 to the variable phase impedance network 17 of Figure 1. As will be apparent, the voltage thus supplied to the network 17 will have the same phasing and may be utilized in the same way as the voltage developed by the grid 11 of Fig. 1.

The output of tube T3 is taken off potentiometer 113 and supplied through a suitable phase adjusting and wave shaping network 114 indicated in block diagram form to a second control grid 115 of the tube T1. The circuit constants are adjusted so that the voltage developed in grid 115 opposes that developed in grid 110, subtracting the signal corresponding to level A, thus reducing the output of tube T1 for the yellow signal to the proper video level (signal above level A in Figure 5) or subtracting the signal due to the constant illumination from source 106. The output of tube T1 is now applied to a control grid of pentode T4 developing video signal in line 116, which is supplied to the transmitting circuits indicated in block diagram form. A second control grid of tube T4 is connected to the color control line 16 of Figure 1, so that there is applied to this grid the appropriate color sync signal for field or line sequential transmission as may be desired.

*Modified color shift sequences*

By reason of the accurate and stable color synchronization provided by the invention, a great variety of color sequences may be employed. Thus, the frequency of the signal 25 or the signals S27, etc., derived therefrom need not be either of horizontal or vertical sweep frequency but may be of an intermediate value, so that two lines in succession (or three or more) are scanned in one color and then a similar number in the next color and so on. Field or line sequential color shifting may, therefore, be regarded as limiting cases, color shifting in any intermediate number of lines between one and a full field being possible. In particular with horizontal interlace and 525 lines for a full frame, as with the present conventional signal, color shifting after each three lines will produce proper color interlacing without need for special color shift pulses during the blanking intervals.

The system is also adaptable to point sequential transmission and reception with or without dot interlace as distinguished from or in addition to line interlace. As a general rule, point sequential systems employ either a plurality of carriers or channels corresponding to the respective color components to be transmitted or transmit the color components in order by a sampling system of one type or another. The adaptability of the present disclosure to such systems will be apparent to those skilled in the art. For point sequential transmission on several channels, the three signals S*r*, S*b* and S*y* may be fed to the three video circuits for the three colors serving as switching pulses therefor, the color shift signals S27, etc. being omitted. Since the pulses in the signals S*r*, S*b* and S*y* may be of practically any desired shape and duration, it will be clear that by utilizing these signals as switching signals for the three color channels, the video signal transmitted in each channel may be picked up at only the center part of the relevant color strip, thus avoiding any danger of overlap or undesirable mixing of colors. For receiving such point sequential color signals, whether transmitted by the present system or otherwise, it will be apparent that it is necessary only to use the similar signals S*r*, etc. at the receiving end as switching signals in the three video channels. Since the video signal received may be broadened as desired, while the signals S*r*, etc. at the receiving end may be shaped as desired, there may be selected only the properly timed portion of such broadened signal, and an exceptionally reliable and stable operation is achieved.

Where the point sequential signals are transmitted by a pulse sampling method, it will be apparent that the signals S*r*, S*b* and S*y* may be suitably shaped to serve as the sampling pulses, their frequency and phase relationship being correct for this purpose. Errors which may otherwise occur due to lack of perfect synchronization between the electron beam and the sampling pulses are thus automatically eliminated. At the receiving end, for receiving pulse sampling signals, whether transmitted by the system of this invention or other system, it will be apparent that the receiver signals S*r*, etc. may again be fed into the video circuit, the sample signals being spread as desired and the signals S*r*, etc. being narrowed to any required extent, so as to insure again perfect synchronization between the scanning of the color strips in the picture tube and the sampled color signals received.

The present system, as pointed out above, does not require identical construction as between transmitter color strip photosensitive surface and receiver color strip fluorescent surface. Thus, the system may be used without difficulty for receiving signals such as transmitted by the RCA electronic system now in process of experimental demonstration and utilizing photosensitive and fluorescent screens having color dots positioned in triangular sets and associated with a masking screen having an aperture for each such dot. In such use, the signal picked up from a set of three such color dots and transmitted (by a pulse sampling system) will be reproduced by excitation of three color dots or color strip sections arranged in a straight line. However, the fineness of structure of the photosensitive and fluorescent surfaces is such as to produce no objectionable alteration in the image. For such reception, it is necessary only to utilize sets of color strips scanned at the same frequency as the mask apertures and to relate sampling frequency properly to the transmitted signal being received. The signals S*r*, etc. at the receiving end being utilized merely to insure correct correspondence between the sampled color signal which is received and the color strip which is scanned, it will be seen that the present system of insuring synchronization between the scanning of the color strips by the electron beam and the color signals received may be used without any substantial difficulty and requiring only very minor modifications in the receiving circuits.

*Alternative methods of blanking or switching the color signals*

While the invention does not require color synchronizing grids having conducting elements corresponding in number and location to each of the color strips, and even makes it possible, as pointed out above, to eliminate the need for any such grids whatever, and thus permits great simplification in the construction both of the camera tube and the picture tube, in its broader aspects the invention may be utilized with camera or picture tubes of known type having a separate grid associated with the strips of each color, in which case, the pulses generated by these grids, when suitably shaped, may be utilized as the color synchronizing pulses. In this case, the need for a phase shifting network will be eliminated.

With suitable circuit changes, it is also possible to utilize color synchronizing grids having conductors spaced apart by a number of color strips not corresponding to and not an even multiple of the number of color strips in a set, suitable provision for shifting color in any desired sequence being made. While such arrangements involve more complexity in the circuits, and, hence, are not considered ordinarily desirable, it will be apparent that the principle of the invention involving the use of color synchronizing pulses taken from the electron beam itself may still be utilized, with such spacing of grid or conducting elements.

As will be noted from the above description, in most applications of the system of the invention, the video output will be passed by the electronic switching mechanism in the transmitter for only a fraction of the time required for the electron beam to pass a set of three strips. The video signal may, however, be spread as desired so as to occupy a time interval corresponding to a larger fraction of the time required to pass three strips and up to the full time required for such passage.

Where the color synchronizing pulses are developed from or keyed by the grid such as the grid 11, the circuit constants may readily be selected so that the voltage developed in the grid will not substantially affect the action of the electron beam in producing or responding to video signals.

In the receiving tube, it is desirable to have at all times a minimum intensity of electron beam in the picture tube even when the received video signals are null so as to maintain the color synchronizing pulses. Such minimum intensity may readily be regulated so as to be low enough not to be visible to the eye.

As will be apparent, any desired color synchronizing pulses pegged with the color shift signals may be used, and, in particular, this may be desirable when receiving or transmitting for transmission or reception with equipment constructed according to other systems.

The video emission or reception may, of course, be adjusted to different levels for the different colors to suit particular transmitting or receiving conditions, and it is not necessary that the video signal be a signal corresponding to a particular component color. Thus, the video signals for the different colors may be superposed upon or added to each other and sorted by known subtracting processes at the receiving end.

As will now be apparent, the system of the invention provides for both transmission and reception with very simple and completely reliable color synchronization which does not depend upon extreme accuracy in manufacture of the screen, which is not susceptible to cumulative errors or creeping, which does not require matching of transmission and reception equipment and which is adaptable to use in a variety of different sequential types of transmission and reception and compatible with a variety of different systems of transmission and reception.

What is claimed is:

1. In a color television system, and in combination, a screen having a cyclically repeated plurality of sets of parallel strips, each set comprising strips corresponding in number and in predetermined order to a number of component colors to be reproduced, means for scanning the said screen by moving an electron beam transversely in a single direction across all of the strips to scan by lines, means responsive to the electron beam for generating a signal in timed relation to the scanning thereby of the strips, the last said means comprising means for clipping video signals to produce a signal corresponding to video signal above a predetermined magnitude, such magnitude being greater than the maximum video signal to be transmitted, and means controlled by the said signal for generating a plurality of video switching signals corresponding in number to the number of component colors, in frequency to the scanning of the sets of strips by the electron beam and in phase to the spacing of strips within a set.

2. In a color television system, and in combination, a camera tube including a photosensitive screen having a cyclically repeated plurality of sets of parallel strips, each set comprising strips corresponding in number and predetermined order to a number of component colors to scan by lines and be reproduced, means for scanning the said screen by moving an electron beam transversely in a single direction across all of the strips to produce a video signal, means for clipping the video signal to produce a signal corresponding to video signal above a predetermined magnitude, means controlled by the last said signal for generating a plurality of video switching signals corresponding in number to the number of component colors, in frequency to the clipped signal and in phase to the spacing of strips within a set, and means for subjecting the photosensitive screen to illumination by a substantially uniform light of color and intensity such as to add to the video signal for one of said component colors a constant component in excess of normal video output in all colors, and in which the means for clipping the said video signal is arranged to clip signal at a level above the said normal video output.

3. The combination according to claim 2, comprising also means for subtracting the said clipped output from the video signal to restore the video signal corresponding to the said color to proper balance of the signals corresponding to other colors.

References Cited in the file of this patent

UNITED STATES PATENTS

| | | |
|---|---|---|
| 2,415,059 | Zworykin | Jan. 28, 1947 |
| 2,461,515 | Bronwell | Feb. 15, 1949 |
| 2,490,812 | Huffman | Dec. 13, 1949 |
| 2,530,431 | Huffman | Nov. 21, 1950 |
| 2,532,511 | Okolicsanyi | Dec. 5, 1950 |
| 2,587,074 | Sziklai | Feb. 26, 1952 |
| 2,617,876 | Rose | Nov. 11, 1952 |
| 2,621,245 | Kell | Dec. 9, 1952 |
| 2,634,325 | Bond | Apr. 7, 1953 |
| 2,634,326 | Goodrich | Apr. 7, 1953 |
| 2,635,141 | Bedford | Apr. 14, 1953 |
| 2,648,722 | Bradley | Aug. 11, 1953 |
| 2,657,257 | Lesti | Oct. 27, 1953 |
| 2,689,269 | Bradley | Sept. 14, 1954 |